US011282263B2

(12) United States Patent
Higueras Esteban et al.

(10) Patent No.: US 11,282,263 B2
(45) Date of Patent: Mar. 22, 2022

(54) COMPUTER IMPLEMENTED METHOD, A SYSTEM AND COMPUTER PROGRAMS FOR COMPUTING SIMULTANEOUS RECTILINEAR PATHS USING MEDICAL IMAGES

(71) Applicants: Galgo Medical, SL, Barcelona (ES); Fundacio Institut Mar d'Investigacions Mediques (IMIM), Barcelona (ES); Universitat Pompeu Fabra, Barcelona (ES); Institucio Catalana De Recerca I Estudis Avancats (ICREA), Barcelona (ES)

(72) Inventors: Alfredo Higueras Esteban, Lleida (ES); Luis Serra Del Molino, Barcelona (ES); Gerardo Conesa Bertran, Barcelona (ES); Ignacio Delgado Martinez, Barcelona (ES); Miguel Angel Gonzalez Ballester, Barcelona (ES)

(*) Notice: Subject to any disclaimer, the term of this patent is extended or adjusted under 35 U.S.C. 154(b) by 92 days.

(21) Appl. No.: 16/902,912

(22) Filed: Jun. 16, 2020

(65) Prior Publication Data
US 2020/0394833 A1    Dec. 17, 2020

(30) Foreign Application Priority Data
Jun. 17, 2019  (EP) .................................... 19382502

(51) Int. Cl.
*G06T 15/08*    (2011.01)
*G06T 7/11*     (2017.01)
*G06T 7/00*     (2017.01)

(52) U.S. Cl.
CPC ............ *G06T 15/08* (2013.01); *G06T 7/0014* (2013.01); *G06T 7/11* (2017.01); *G06T 2200/08* (2013.01);
(Continued)

(58) Field of Classification Search
CPC ................. G06T 15/08; G06T 2200/08; G06T 2207/10072; G06T 2207/10076;
(Continued)

(56) References Cited

U.S. PATENT DOCUMENTS 10,123,841 B2    11/2018 Kim et al.
2011/0137156 A1*  6/2011 Razzaque .......... A61B 18/1477
                                                    600/424
(Continued)

FOREIGN PATENT DOCUMENTS

WO    WO2012013920    2/2012
WO    WO2017043926    3/2017
WO    WO2018055395    3/2018

OTHER PUBLICATIONS

Shamir et al., Reduced Risk Trajectory Planning in Image-Guided Keyhole Neurosurgery; Medical Physics, May 1, 2012; pp. 2885-2895; Medical Physics vol. 39, No. 5; AIP, Melville, NY, US.
(Continued)

*Primary Examiner* — Ming Wu
(74) *Attorney, Agent, or Firm* — Allen, Dyer, Doppelt & Gilchrist, P.A.

(57) ABSTRACT

A method, system and computer programs for computing simultaneous rectilinear paths using medical images are disclosed. The method comprises receiving a 3D medical image comprising voxels representing a volume of an anatomical region of a patient and a preliminary path determined by two points traversing said 3D medical image, wherein said 3D medical image has segmented therein at least one area of interest, the preliminary path comprising a security zone with a given distance; computing a distance map of said area of interest and mapping its voxels to a first value or to a second value depending on a distance threshold, the latter being equal to said given distance of the security zone; selecting the voxels having said second value
(Continued)

and projecting them using a frustum that projects the preliminary path onto a single point, to obtain a 2D projected image that includes a plurality of rectilinear paths.

14 Claims, 4 Drawing Sheets

(52) U.S. Cl.
CPC .............. *G06T 2207/10072* (2013.01); *G06T 2207/30016* (2013.01)

(58) Field of Classification Search
CPC . G06T 2207/20041; G06T 2207/30004; G06T 2207/30016; G06T 7/0014; G06T 7/11; G06T 7/155
See application file for complete search history.

(56) References Cited

U.S. PATENT DOCUMENTS

| | | | | |
|---|---|---|---|---|
| 2013/0197357 A1* | 8/2013 | Green | ............... | A61B 6/12 600/424 |
| 2013/0273968 A1* | 10/2013 | Rhoads | ............... | H04W 4/50 455/556.1 |
| 2013/0278631 A1* | 10/2013 | Border | ............... | G02C 5/143 345/633 |
| 2014/0003696 A1 | 1/2014 | Taghva | | |
| 2016/0117857 A1* | 4/2016 | State | ............... | A61B 34/20 345/420 |
| 2017/0000567 A1 | 1/2017 | Kim et al. | | |

OTHER PUBLICATIONS

De Momi, Multi-Trajectories Automatic Planner for StereoElectroEncephaloGraphy (SEEG); International Journal of Computer Assisted Radiology and Surgery, Nov. 1, 2014; pp. 1087-1097; International Journal of Computer Assisted Radiology and Surgery, vol. 9, No. 6.

Scorza et al., Safe Electrode Trajectory Planning in SEEG via MIP-Based Vessel Segmentation; Proc of SPIE, 2017; Proc. of SPIE, vol. 10135.

Rincon-Nigro et al., GPU-Accelerated Interactive Visualization and Planning of Neurosurgical Interventions; IEE Computer Graphics and Applications, Jan./Feb. 2014; pp. 14-23.

European Search Report, dated Sep. 5, 2019, EP19382502, entire document.

* cited by examiner

COMPUTER IMPLEMENTED METHOD, A SYSTEM AND COMPUTER PROGRAMS FOR COMPUTING SIMULTANEOUS RECTILINEAR PATHS USING MEDICAL IMAGES

TECHNICAL FIELD

The present invention is directed, in general, to the field of medical images analysis. In particular, the invention relates to a computer implemented method, a system and computer programs for computing simultaneous rectilinear paths, which traverse a given portion/area of a patient, using medical images.

In this document, by Go zone it should be understood a zone with anatomical objects or structures which are desirable for a path to traverse, for example Broca's area, and by No-Go zone it should be understood a zone in which anatomical objects or structures are present which should not be traversed by the path, for example a vessel or a ventricle.

BACKGROUND OF THE INVENTION

In neurosurgical planning, for example for the implantation of deep electrodes, paths are usually first planned to reach some target structure (usually located at the beginning—cortical—or the end of the path—hippocampus—referred as Go zone). After an initial planning, paths are then checked to be free of so called No-Go zones which could impose a surgical risk. Specifically, each path is modelled as a cylinder surrounding the trajectory with a certain radius. This cylindrical shape is commonly referred to as the security zone, and must be free of No-Go zones in order for the trajectory to be validated.

Currently, checking and correcting paths is a tedious task which involves manually traversing 2D slices of three-dimensional (3D) medical images back and forth while moving the beginning and end of the path until the whole security zone is free of No-Go zones.

Some patents and patent applications are known in this field.

US 2014003696-A discloses methods and apparatus for identifying and evaluating surgical stereotactic trajectories to a target area. Entry points and trajectories are evaluated based on segmented images. The segmentation process may involve segmenting the anatomical region into discrete regions. Candidate entry points are evaluated according to image intensity following segmentation of the anatomical region. Candidate entry points may be refined according to various angle corridors. Following identification of a target area, for each candidate entry point, the proposed trajectory is evaluated using segmented image data (e.g., identifying tissue types) and image intensity. The final proposed trajectory is based on derivation of a statistic for each trajectory indicating the deviation at each point from the mean region of interest image intensity and selection of trajectory with the lowest statistic value. The proposed trajectory is then presented to a computer user.

WO 2018055395 discloses a computer system and corresponding method to assist in planning a trajectory for a surgical insertion into a skull to a target representing an anatomical region. The computer system is configured to: provide the computer system with a three-dimensional image representation of the skull and brain which has been parcellated into anatomical regions, including an identification of critical objects comprising structures within the brain to be avoided during the surgical insertion; provide the computer system with a region of interest comprising an anatomical region within the brain representing the target of the trajectory for the surgical insertion; determine a metric for voxel locations within the anatomical region corresponding to the region of interest, the metric representing the suitability of each of the voxel locations to be a target location for the trajectory; select a set of one or more voxel locations having the greatest suitability according to the metric within the region of interest, each of the one or more selected voxel locations representing a potential target location for the trajectory; and identify a trajectory for the surgical insertion to a potential target location in the region of interest.

U.S. Ser. No. 10/123,841-B2 discloses a method for generating an insertion trajectory of a medical device such as an electrode. The method uses brain images, and segments mask regions that should not be damaged (invasion prohibited regions), for example vessels, ventricles, etc. The method then takes as starting point an initial insertion region defined by an entry range marked on the surface of the patient scalp. The initial insertion region connects to a target (as shown in FIG. 22(a)) and defines a truncated cone shape having a progressively diminishing cross-sectional towards the target. If the entry range is not circular, a cone fitting process may be performed. This initial truncated cone may partially run across the invasion prohibited regions and needs to be adjusted in 3D, to obtain a safe entry region which is another truncated cone. This new truncated cone is obtained by resizing the cone radius and adjusting its angle, solving a 3D problem, to avoiding the invasion prohibited regions. One way to do this is to calculate the distance from the boundary of the initial entry region to the invasion prohibited area. For instance, as shown in FIG. 22(a), a distance map from the boundary of the initial entry region to the voxels of the invasion prohibited regions is generated by ray casting from the target. Thus, in this US patent, the term 'distance map' means the different radius of the cone that result in the size of the cone, located on regularly spaced planes with respect to the selected insertion trajectory as shown in FIG. 8. Moreover, unlike in present invention, the distance map is relative to the trajectory of a truncated cone, and not a distance map made from the volume of data, generated from a segmented area of interest such as a Go or No-Go zone.

Also, the term 'ray casting' used in U.S. Ser. No. 10/123,841-B2 does not refer to an actual rendering projection, but to a casting of rays to find the boundaries of the truncated cone. The authors state that "Volume rendering and surface rendering are the techniques to visualize each data and show it to a person's eyes, as it needs to be confirmed by the person" meaning that the rendering is intended to visualize the trajectory path and the imaging data from the point of view of the person inspecting it, and not from the point of view of the target or entry point.

WO 2012013920 relates to a method and system for detecting anomalies in a set of data. The method comprises storing one or more standard data sets of a plurality of different standard cases, each standard case containing one or more standard data points representing variation within normal, non-anomalous, data; calculating a first average difference measure between one or more test data points in the test data set and the corresponding standard data points in at least one of the plurality of cases in the standard data set that are closest in value to the test data point (i.e. the test point's neighbors in the standard data set); determining a second average difference measure between the neighbors of each test point across cases in the standard data set in s; calculating a normalized difference measure relating to the one or more test data points in dependence on at least the first and second average difference measures; and identifying a test data point as anomalous in dependence on the value of the calculated normalized difference measure for the test data point. Therefore, this international patent application relates to anomaly detection and not to collision detection of rectilinear paths. A reference image (i.e. normal brain) is also required. Moreover, this method does not compute any trajectory, does not take into consideration a security zone/radius and does not perform any projection.

Furthermore, [1] proposes a method to assist surgeons during trajectory planning of electrodes in SEEG. Maximum Intensity Projection (MIP) images are used to enhance vessel structures around the electrode, while an automatic segmentation method allows eliminating possible unconnected noisy pixels. In this paper reference is made to the use of a 'distance map' in the optimization of electrodes (with a performance of 160+/−102 seconds per electrode, reflecting the complexity of having to perform the calculations in 3D space). In the section "Advanced trajectories verification module" reference is made to the use of MIP in which it is specified that only a portion of the original volume is projected (not the distance map volume), and this module is used only for visualization (not for calculation): "The user can select an electrode and apply a probe eye view, which allows the visualization on the plane perpendicular to the electrode trajectory on the original angiography dataset. In addition, a volume portion can be selected to generate maximum intensity projection (MIP) images on that plane".

That is, in this paper reference is made to the use of a distance map (to be used in an optimization function in 3D space), and to the use of a projection only in order to visualize the results, not to calculate them). However, the paper does not make use of the two combined tools, which is the key to the resulting acceleration of the calculations.

Likewise, [2] proposes a semi-automated GPU accelerated method to process, visualize, and plan interventions at interactive or nearly real-time speed. The method has two main components: it embeds the geometrical structures representing critical-tissue areas pertinent to the procedure in spatial data structures, this speeds up computation of the geometric queries involved in estimating the risk for paths, and it implements computation on CPUs, which exploits the problem's parallel nature while effectively handling the involved irregular workload.

The related work only considers methods to check trajectories one at a time against certain criteria for collisions (constraints, metrics, segmented voxels in 3D, etc.). The trajectory is checked to meet the criteria for inclusion as safe paths. If the trajectory does not fulfil the criteria, it needs to be adjusted in 3D space, solving a non-trivial problem that may be computationally expensive and slow. The adjustment may not lead to a solution, for a given trajectory, and a new trajectory would have to be processed again. This is a repetitive process of trial and error, that is tedious and time-consuming, and the faster and easier to perform the checking and adjustment of the trajectories, the better it would lead to a solution.

Furthermore, the method described by [2] is mesh based—instead of voxel based—and requires as input one single point, the target point. In contrast, present invention requires two points, the entry and the target point, and is completely symmetric. That is, it could be either used to compute alternative paths with the same entry point, or with the same target point, while [2] only allows for the latter.

Accordingly, new and improved methods for fast computation checks for collisions for a trajectory and more importantly, simultaneously providing solutions for the adjustment of the trajectory to obtain safe rectilinear paths using medical images are needed. This will help to automatically identify if a path/trajectory provided by an epileptologist (i.e. a doctor) collides or not with certain areas of interest and simultaneously to provide a surgical plan with alternatives paths.

REFERENCES

[1] D. Scorza, S. Moccia, G. De Luca, L. Plaino, F. Cardinale, L. S. Mattos, L. Kabongo, and E. De Momi, "Safe electrode trajectory planning in SEEG via MIP-based vessel segmentation," Proc. SPIE 10135, Med. Imaging 2017 Image-Guided Proced. Robot. Interv. Model., vol. 10135, no. i, p. 1013520-10135208, 2017.
[2] M. Rincon-Nigro, N. V. Navkar, N. V. Tsekos, and Z. Deng, "GPU-accelerated interactive visualization and planning of neurosurgical interventions," IEEE Comput. Graph. Appl., vol. 34, no. 1, pp. 22-31, 2014.

DESCRIPTION OF THE INVENTION

To that end, embodiments of the present invention provide a computer implemented for computing simultaneous rectilinear paths using medical images, which can be used for planning SEEG intracranial electrodes, for introducing a biopsy needle into a given body portion of a patient or for radiotherapy, among others.

The method is executed by a processor of a computer system and comprises receiving, as inputs, a 3D medical image having voxels representing a volume of an anatomical region of a patient and a preliminary path determined by two points (a first point and a second point) traversing the 3D medical image. The 3D medical image has segmented therein at least one area of interest and the preliminary path comprises a security zone with a given distance that defines how far the path should be from the cited area of interest to decide if the path should be accepted or rejected.

With the received inputs, then the method further comprises: computing a distance map of the area of interest, said distance map providing a new 3D image with the same dimensions of the original 3D medical image and comprising voxels, each voxel indicating a distance value to the area of interest; mapping the voxels having a distance value greater than a distance threshold to a first value and mapping the voxels having a distance value equal or smaller than the distance threshold to a second value, wherein the distance threshold is equal to said given distance of the security zone; selecting the voxels having said second value; and projecting the selected voxels using a frustum that projects the preliminary path onto a single point (or pixel), so that obtaining a 2D projected image that includes a plurality of rectilinear paths, that can serve as alternatives to the preliminary path.

The 2D projected image comprises pixels each having one of said first or second values. The pixels having the second value indicate that the rectilinear path associated with that pixel traverses the 3d medical image at a distance less than or equal to the distance threshold from the area of interest (and thus is likely to hit the area of interest, for example a vessel), whereas the pixels having the first value indicate that the rectilinear path traverses the 3d medical image at a distance greater than the distance threshold from the area of interest.

By performing said projection, the 3D computation is transformed into a 2D computation, which requires less memory and computational power. Moreover, it can be visually inspected if the preliminary path traverses the area of interest by checking the value of a single point in the 2D projected image.

Therefore, the proposed method by combining a distance map and volume rendering can check multiple security zones efficiently, allowing for assessing if the preliminary path provided by the doctor is safe, and at the same time, computing multiple safe alternatives to it. The method can check paths parallel to the original one, or confocal paths sharing either the same beginning or end with the original path, depending on the projection used.

The received 3D medical image can be any of a Computed Tomography (CT) image, a Magnetic Resonance Imaging (MRI) image, an Angiography, a nuclear medicine functional image such as a Positron-emission tomography (PET), among others.

Different types of projections can be used. If a perspective projection is used, the plurality of rectilinear paths all traverse said first point of the preliminary path. Alternatively, the rectilinear paths all can traverse points which lies in a plane defined by the first point of the preliminary path. In both these cases, the paths have different lengths. If an orthogonal projection is used, the rectilinear paths all have the same length as the preliminary path and are parallel to each other. If a spherical projection is used, the rectilinear paths all traverse the first point of the preliminary path and have the same length. The requirement is for the projection to project the preliminary path onto a single point/pixel.

Furthermore, the cited area of interest can be a Go, e.g. an area of the brain that has to be traversed, or a No-Go zone, e.g. an area containing a vessel, hence to avoid major risk hitting of the vessel should be avoided.

In particular, the first and second values are color values, wherein the first value is a transparent color and the second value is an opaque color.

In an embodiment, the method further selects one rectilinear path. For example, the processor can select the rectilinear path having the transparent pixel at a smallest distance from the pixel of the preliminary path.

The method described herein for a single 3D medical image can be easily extended to multiple medical images. In that case, the same projection is performed on several 3D images (which can be achieved if the medical images are co-registered) to obtain a 2D projected image from each one. In this case, in order to accept or reject a path, the processor would check the values for the same pixel location on all 2D projected images.

Other embodiments of the invention that are disclosed herein also include a system and software programs to perform the method embodiment steps and operations summarized above and disclosed in detail below. More particularly, a computer program product is one embodiment that has a computer-readable medium including computer program instructions encoded thereon that when executed on at least one processor in a computer system causes the processor to perform the operations indicated herein as embodiments of the invention.

BRIEF DESCRIPTION OF THE DRAWINGS

The previous and other advantages and features will be more fully understood from the following detailed description of embodiments, with reference to the attached figures, which must be considered in an illustrative and non-limiting manner, in which.

DETAILED DESCRIPTION OF PREFERRED EMBODIMENTS

In the case of medical images, it is not uncommon the desire to plan rectilinear paths which traverse a given portion of a patient. Some examples of this are the planning of SEEG intracranial electrodes, needle biopsy or radiotherapy, among others. These medical images can give information about either areas that have to be explored, and thus, traversed with a rectilinear path, or areas that should not be traversed with a rectilinear path because they could impose a risk for the patient. In both cases, present invention computes if a rectilinear path collides with certain areas of interest or not.

Figure 1:
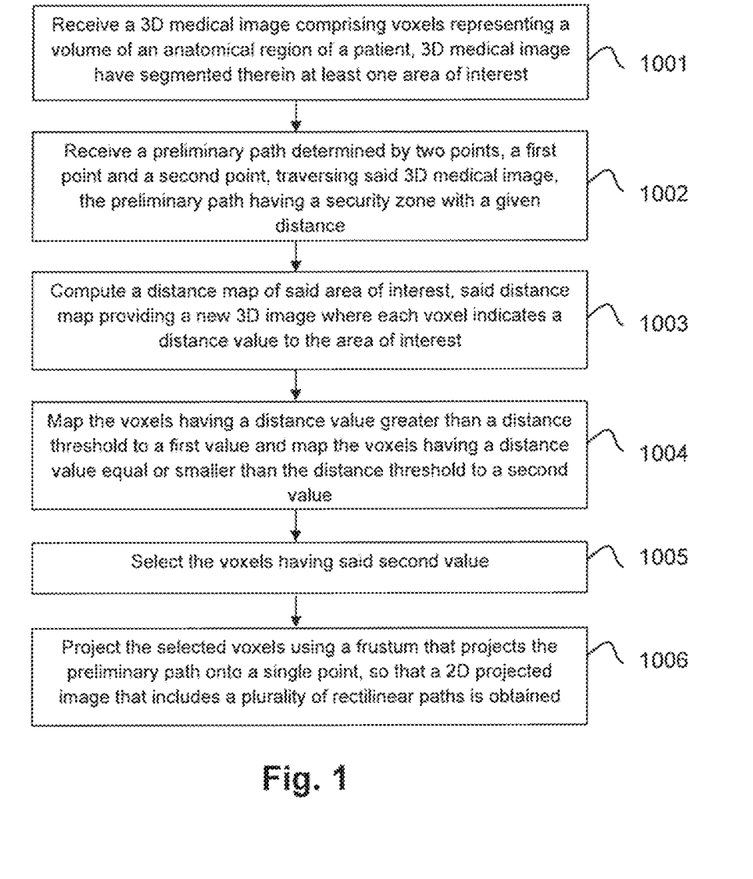
FIG. 1 is a flow chart illustrating an embodiment of a method for computing simultaneous rectilinear paths using medical images.

FIG. 1 shows an embodiment of the proposed method. According to this embodiment, step 1001, a computer receives a 3D medical image 100 comprising voxels representing a volume of an anatomical region of a patient, for example the brain, where the 3D medical image 100 have segmented therein at least one area of interest 101. At step 1002, the computer further receives a preliminary path 110 determined by two points, a first point P1 and a second point P2, traversing said 3D medical image 100, where the preliminary path 110 (i.e. the path indicated by the doctor) comprises a security zone 111 with a given distance. At step 1003, the computer computes a distance map 120 of said area of interest 101, said distance map 120 providing a new 3D image where each voxel thereof indicates a distance value to the area of interest 101. At step 1004, the computer maps the voxels that has a distance value greater than a distance threshold to a first value, in particular to a transparent color, and maps the voxels that has a distance value equal or smaller than the distance threshold to a second value, in particular to an opaque color. The distance threshold is equal to said given distance of the security zone 111. At step 1005, the computer selects those voxels that has said second value and projects 130 the selected voxels, step 1006, using a frustum 131 that projects the preliminary path 110 onto a single point (or pixel), so that a 2D projected image 140 that includes a plurality of rectilinear paths is obtained.

FIG. 2 graphically illustrates the above detailed steps of FIG. 1. In particular, FIGS. 2A and 2B graphically depicts steps 1001 and 1002, respectively. FIG. 2C illustrates step 1003, i.e. the computation of the distance map 120. Finally, FIG. 2D illustrates step 1006, i.e. the projection 130 of the preliminary path 110 onto a single point/pixel, in this particular case a perspective projection.

Figure 2A:
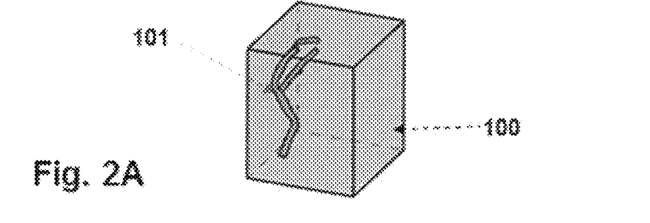
FIGS. 2A-2D illustrates in a graphical way the steps of FIG. 1.
Figure 2B:
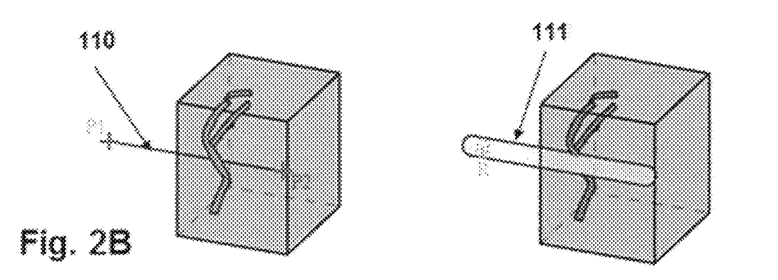
Figure 2C:
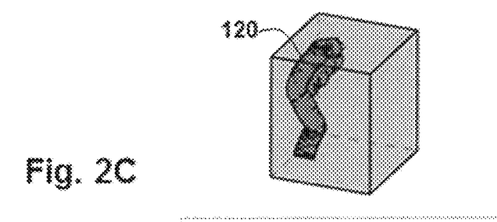
Figure 2D:
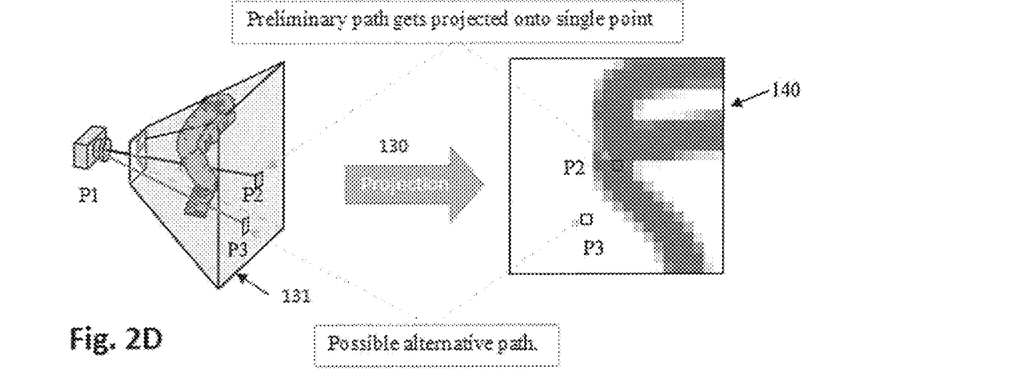

The 2D projected image comprises pixels each one having one of said transparent or opaque color. Thus, the pixels comprising the second value/opaque color indicate that the rectilinear path traverses the area of interest 101 at a distance less than or equal to the distance threshold and the pixels comprising the first value/transparent color indicate that the rectilinear path traverses the area of interest 101 at a distance greater than the distance threshold.

In case the preliminary path 110 is rejected, different strategies can be implemented in order to select the best/optimized alternative rectilinear path from the plurality of rectilinear paths which have not been rejected, if any. For example, in an embodiment, the criteria selection chosen by the computer is to select the rectilinear path having the transparent pixel which is at the smallest distance (measured in the 2D projected image) from the pixel of the preliminary path 110. It should be noted that other criteria selection is possible.

Figure 3A:
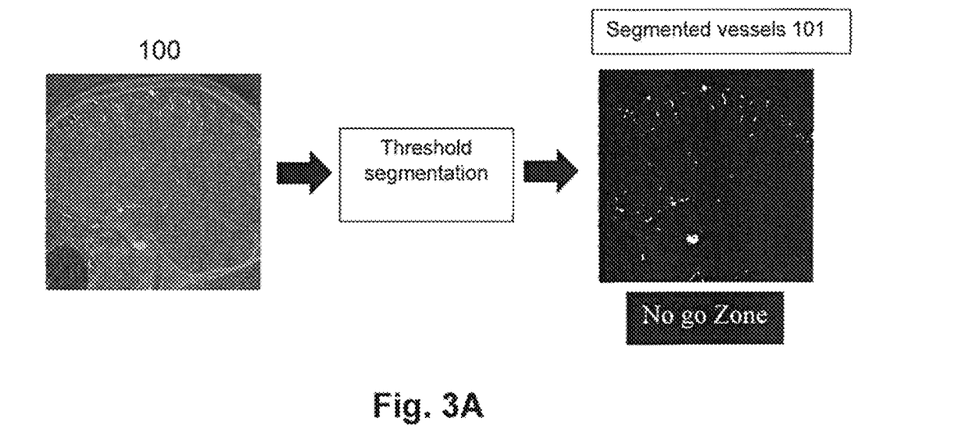
FIGS. 3A and 3B show two different embodiments of areas of interest that do not have to be traversed or No-Go zone (FIG. 3A) and of areas that have to be traversed or Go zone (FIG. 3B).
Figure 3B:
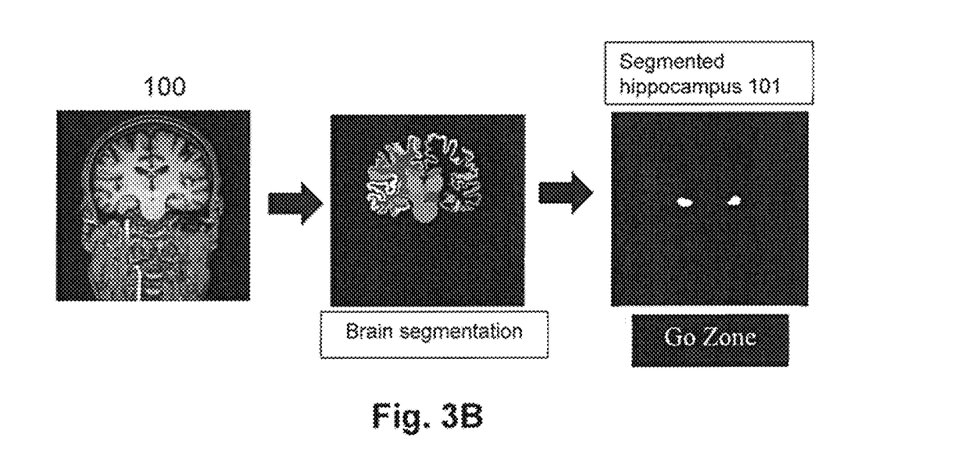

The cited area of interest 101 can be a Go zone or a No-Go zone. FIG. 3A shows an example of a 3D X-ray Angiography medical image (depicted only as a 2D plane for simplicity), and some areas of interest 101 from that medical image 100 corresponding to vessels. Hitting a vessel with the preliminary path 110 could provoke bleeding, and thus is a major risk which should be avoided. FIG. 3B shows an example of a T1 Magnetic resonance image giving anatomical information of the inside of the brain. With this image some areas of interest 101 can be segmented and the preliminary path 110 should traverse them.

Different type of projections 130 can be used for executing said step 1006, for example a perspective projection technique, an orthogonal projection technique or a spherical projection technique.

Figure 4A:
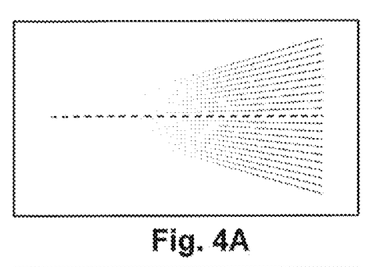
FIGS. 4A-4D show examples of the different projections used by the present invention.
Figure 4B:
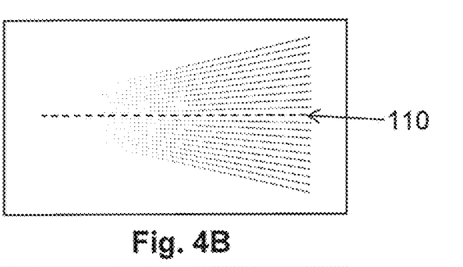

In an embodiment, see FIG. 4A, a perspective projection is used. In this case, the plurality of rectilinear paths all traverse said first point of the preliminary path 110. Similar to this previous projection, another perspective projection can be used, see FIG. 4B, but in this latter case with one point on a near clip plane and the other in a far clip plane. The paths in this case will have different length. The different alternative paths do not cross at the first point P1 of the preliminary path 110, but at another point which lies in the line defined by the first point P1 and the second point P2.

Figure 4C:
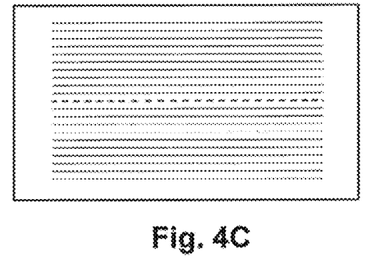

In another embodiment, see FIG. 4C, an orthogonal projection is used. In this case, an orthographic camera is used. The plurality of rectilinear paths now contain paths which are the same length as the preliminary one, and parallel to each other.

Figure 4D:
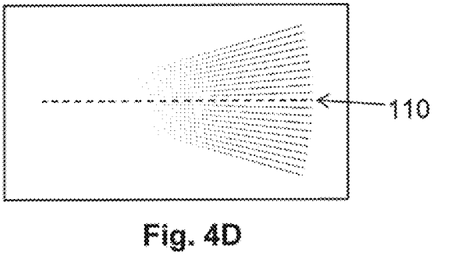

In yet another embodiment, see FIG. 4D, a spherical projection is used. This case is similar to the perspective projection of the first detailed embodiment but yields rectilinear paths which are all the same length.

Various aspects of the proposed method may be embodied in programming. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors, or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of a scheduling system into the hardware platform(s) of a computing environment or other system implementing a computing environment or similar functionalities in connection with image processing. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

A machine-readable medium may take many forms, including but not limited to, a tangible storage medium, a carrier wave medium or physical transmission medium. Non-volatile storage media include, for example, optical or magnetic disks, such as any of the storage devices in any computer(s), or the like, which may be used to implement the system or any of its components shown in the drawings. Volatile storage media may include dynamic memory, such as a main memory of such a computer platform. Tangible transmission media may include coaxial cables; copper wire and fiber optics, including the wires that form a bus within a computer system. Carrier-wave transmission media may take the form of electric or electromagnetic signals, or acoustic or light waves such as those generated during radio frequency (RF) and infrared (IR) data communications. Common forms of computer-readable media may include, for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a physical processor for execution.

Those skilled in the art will recognize that the present teachings are amenable to a variety of modifications and/or enhancements. For example, although the implementation of various components described herein may be embodied in a hardware device, it may also be implemented as a software only solution—e.g., an installation on an existing server. In addition, image processing as disclosed herein may be implemented as a firmware, firmware/software combination, firmware/hardware combination, or a hardware/firmware/software combination.

The present disclosure and/or some other examples have been described in the above. According to descriptions above, various alterations may be achieved. The topic of the present disclosure may be achieved in various forms and embodiments, and the present disclosure may be further used in a variety of application programs. All applications, modifications and alterations required to be protected in the claims may be within the protection scope of the present disclosure.

The invention claimed is:

1. A computer implemented method for computing simultaneous rectilinear paths using medical images, the method comprising performing, by a processor of a computer system, the following steps:
  receiving a first 3D medical image comprising voxels representing a volume of an anatomical region of a patient, and a preliminary path determined by two points, a first point and a second point, traversing the first 3D medical image;

the first 3D medical image having at least one area of interest segmented therein; the preliminary path comprising a security zone with a given distance;

providing a second 3D medical image by computing a distance map of the area of interest, the second 3D medical image having same dimensions as the first 3D medical image and comprising voxels each one configured to indicate a distance value to the area of interest;

mapping the voxels associated with a distance value greater than a distance threshold to a first value and mapping the voxels associated with a distance value equal or smaller than the distance threshold to a second value the distance threshold being equal to the given distance of the security zone;

selecting the voxels mapped to the second value; and obtaining a 2D projected image that includes a plurality of rectilinear paths by projecting the selected voxels using a frustum that projects the preliminary path onto a single point, the 2D projected image comprising pixels each one having one of the first or second values, where the pixels having the second value indicate that the rectilinear path traverses the first 3D medical image at a distance less than or equal to the distance threshold from the area of interest, and the pixels having the first value indicate that the rectilinear path traverses the 3D medical image at a distance greater than the distance threshold from the area of interest.

2. The method of claim 1, wherein the projecting is performed using a perspective projection technique; the plurality of rectilinear paths all traversing the first point of the preliminary path.

3. The method of claim 1, wherein the projecting is performed using a perspective projection technique; the plurality of rectilinear paths all traversing a point which lies in a plane defined by the first point of the preliminary path.

4. The method of claim 1, wherein the projecting is performed using an orthogonal projection technique; the plurality of rectilinear paths all having a same length as the preliminary path and are parallel to each other.

5. The method of claim 1, wherein the projecting is performed using a spherical projection technique; the plurality of rectilinear paths all traversing the first point of the preliminary path and have a same length.

6. The method of claim 1, wherein a near clip plane of the frustum contains one of the two points of the preliminary path and a far clip plane of the frustum contains the other point of the preliminary path.

7. The method of claim 1, wherein the at least one area of interest is a Go or a No-Go zone.

8. The method of claim 7, wherein each one of the first value and the second values are color values; the first value corresponding to a transparent color and the second value corresponding to an opaque color.

9. The method of claim 8, further comprising selecting one of the plurality of rectilinear paths, the selected rectilinear path being the path that has a transparent pixel color, and being the path that is at the smallest distance from the pixel of the preliminary path.

10. The method of claim 1, wherein the anatomical region of the patient is the brain.

11. The method of claim 1, wherein the first 3D medical image is a Computed Tomography (CT) image, a Magnetic Resonance Imaging (MRI) image, an Angiography, or a nuclear medicine functional image including a Positron-emission tomography (PET).

12. A system for computing simultaneous rectilinear paths using medical images, said system comprising:

a processor;

software executable on the processor to:

receive a first 3D medical image comprising voxels representing a volume of an anatomical region of a patient, and a preliminary path determined by two points, a first point and a second point, traversing said 3D medical image; said 3D medical image having at least one area of interest segmented therein; said preliminary path comprising a security zone with a given distance;

provide a second 3D medical image by computing a distance map of said area of interest, said second 3D medical image having a same dimensions as said first 3D medical image and comprising voxels each one indicating a distance value to the area of interest;

map the voxels associated with a distance value greater than a distance threshold to a first value and map the voxels associated with a distance value equal or smaller than the distance threshold to a second value, the distance threshold being equal to said given distance of the security zone;

select the voxels having said second value; and obtain a 2D projected image comprising a plurality of rectilinear paths by projecting the selected voxels using a frustum that projects the preliminary path onto a single point, said 2D projected image comprises pixels each one having one of said first or second values; the pixels having the second value indicate that the rectilinear path traverses the first 3D medical image at a distance less than or equal to the distance threshold from the area of interest and the pixels having the first value indicate that the rectilinear path traverses the first 3D medical image at a distance greater than the distance threshold from the area of interest.

13. The system of claim 12, wherein the at least one area of interest is a Go or a No-Go zone; each one of said first value and said second values being color values, said first color value corresponding to a transparent color and the second color value corresponding to an opaque color; the software further selecting one of said plurality of rectilinear paths by selecting a path having a transparent pixel color that is the most similar to the preliminary path.

14. A non-transitory computer readable medium including code instructions that when executed in a computer system implement the steps of the method of:

receiving a first 3D medical image comprising voxels representing a volume of an anatomical region of a patient;

receiving a preliminary path determined by two points, a first point and a second point, traversing the first 3D medical image;

the first 3D medical image having at least one area of interest segmented therein, the preliminary path comprising a security zone with a given distance;

providing a second 3D medical image by computing a distance map of said area of interest, the second 3D medical image having same dimensions as the first 3D medical image and comprising voxels each one configured to indicate a distance value to the area of interest;

mapping the voxels having a distance value greater than a distance threshold to a first value and mapping the voxels having a distance value equal or smaller than the distance threshold to a second value; the distance threshold is equal to the given distance of the security zone;

selecting the voxels having said second value; and obtaining a 2D projected image that includes a plurality of rectilinear paths by projecting the selected voxels using a frustum that projects the preliminary path onto a single point, the 2D projected image comprises pixels each having one of the first value or the second value, where the pixels having the second value indicate that the rectilinear path traverses the first 3D medical image at a distance less than or equal to the distance threshold from the area of interest and the pixels having the first value indicate that the rectilinear path traverses the first 3D medical image at a distance greater than the distance threshold from the area of interest.

* * * * *